US008864161B2

(12) United States Patent
Baron

(10) Patent No.: US 8,864,161 B2
(45) Date of Patent: Oct. 21, 2014

(54) VEHICLE HAVING A SWIVEL WHEEL

(71) Applicant: Yoram Baron, Moshave Nir (IL)

(72) Inventor: Yoram Baron, Moshave Nir (IL)

(73) Assignee: Smart Trike MNF Pte Ltd., Park Mall (SG)

( * ) Notice: Subject to any disclaimer, the term of this patent is extended or adjusted under 35 U.S.C. 154(b) by 0 days.

(21) Appl. No.: 14/222,559

(22) Filed: Mar. 21, 2014

(65) Prior Publication Data

US 2014/0203527 A1 Jul. 24, 2014

Related U.S. Application Data

(63) Continuation of application No. 14/156,666, filed on Jan. 16, 2014, which is a continuation of application No. 13/888,603, filed on May 7, 2013, now abandoned, which is a continuation of application No. 13/493,407, filed on Jun. 11, 2012, now Pat. No. 8,439,385.

(60) Provisional application No. 61/523,215, filed on Aug. 12, 2011.

(51) Int. Cl.
*B62J 7/00* (2006.01)
*B62K 9/02* (2006.01)
*B62K 5/02* (2013.01)

(52) U.S. Cl.
CPC .... *B62K 5/02* (2013.01); *B62K 9/02* (2013.01)
USPC ....... 280/288.4; 280/291; 280/295; 280/32.5; 280/293

(58) Field of Classification Search
None
See application file for complete search history.

(56) References Cited

U.S. PATENT DOCUMENTS

| 2,202,479 A | 5/1940 | Bullock |
| 2,672,351 A | 3/1954 | Kane |
| 3,485,507 A | 12/1969 | Christof |
| 3,863,472 A | 2/1975 | Klingfus |
| 3,963,472 A * | 6/1976 | Young ............................... 71/33 |
| 4,714,261 A * | 12/1987 | Kassai .......................... 280/7.1 |
| 5,011,133 A | 4/1991 | Myers, Sr. |
| 5,028,066 A | 7/1991 | Garth |

(Continued)

FOREIGN PATENT DOCUMENTS

| CN | 101691130 A | 4/2010 |
| CN | 201825196 U | 5/2011 |

(Continued)

*Primary Examiner* — John Walters
*Assistant Examiner* — James Triggs
(74) *Attorney, Agent, or Firm* — Finnegan, Henderson, Farabow, Garrett & Dunner LLP

(57) ABSTRACT

A tricycle may be operable between a first mode of operation steerable by a tricycle rider, and a second mode of operation steerable by an individual pushing the tricycle. A rider handle, in the first mode, may be configured to be rotationally coupled with the stem in a manner permitting a tricycle rider to exert forces on the rider handle and thereby turn the fork, and the rider handle in the second mode, being configured to be rotationally uncoupled from the stem, preventing forces on the rider handle from turning the fork. At least one rotation restrictor may be included for preventing the frost wheel from turning to a position where the front wheel axis leads the fork axis, and for maintaining the front wheel axis in a position trailing the fork axis both when the tricycle is propelled by a tricycle rider in the first mode and when the tricycle is pushed from behind in the second mode.

22 Claims, 16 Drawing Sheets

(56) References Cited

U.S. PATENT DOCUMENTS

| | | | |
|---|---|---|---|
| 5,085,063 A | 2/1992 | Van Dyke et al. | |
| 5,499,834 A * | 3/1996 | Pasin et al. | 280/282 |
| 6,082,754 A * | 7/2000 | Jeunet et al. | 280/272 |
| 6,120,048 A | 9/2000 | Li | |
| 6,149,178 A | 11/2000 | Bradbury et al. | |
| 6,302,421 B1 * | 10/2001 | Lee | 280/210 |
| 6,343,806 B1 * | 2/2002 | Lee | 280/272 |
| 6,376,884 B1 | 4/2002 | Kettier | |
| 6,378,884 B1 * | 4/2002 | Kettler | 280/279 |
| 6,443,469 B1 | 9/2002 | Cross et al. | |
| 6,530,589 B1 | 3/2003 | Ma | |
| 6,612,598 B2 | 9/2003 | Wu | |
| 6,666,470 B2 | 12/2003 | Li | |
| 6,685,207 B1 | 2/2004 | Blake | |
| 6,688,633 B2 * | 2/2004 | van't Schip | 280/642 |
| 6,799,722 B2 | 10/2004 | Kettler | |
| 6,799,772 B2 * | 10/2004 | Kettler et al. | 280/279 |
| 6,811,172 B2 | 11/2004 | Yen | |
| 6,811,173 B1 | 11/2004 | Shih | |
| 6,840,527 B1 | 1/2005 | Michelau et al. | |
| 6,874,802 B2 * | 4/2005 | Gunter et al. | 280/288.4 |
| 6,908,091 B2 * | 6/2005 | Chuang | 280/87.041 |
| 7,000,935 B2 * | 2/2006 | Gunter et al. | 280/272 |
| 7,044,491 B2 | 5/2006 | Kettler | |
| 7,281,725 B1 * | 10/2007 | Gunter et al. | 280/272 |
| 7,347,071 B2 * | 3/2008 | Nakai et al. | 70/186 |
| 7,614,633 B2 * | 11/2009 | Goring | 280/280 |
| 2002/0089144 A1 | 7/2002 | Kettler | |
| 2003/0014169 A1 | 1/2003 | Kato et al. | |
| 2003/0201621 A1 | 10/2003 | Jang | |
| 2004/0164515 A1 | 8/2004 | Gunter et al. | |
| 2011/0074125 A1 | 3/2011 | Aiken et al. | |
| 2011/0278815 A1 | 11/2011 | Khare et al. | |

FOREIGN PATENT DOCUMENTS

| | | |
|---|---|---|
| DE | 29822875 U1 | 6/2000 |
| EP | 0 839 706 | 5/1998 |
| EP | 1048559 A1 | 11/2000 |
| FR | 2 187 592 | 1/1974 |
| FR | 2 930 929 | 11/2009 |
| FR | 2955080 (A1) | 7/2011 |
| GB | 1 422 409 | 1/1976 |
| JP | 2001-247072 | 9/2001 |
| JP | 2001-315681 | 11/2001 |
| JP | 2006-298161 | 11/2006 |
| NL | 1023930 (C2) | 1/2005 |

* cited by examiner

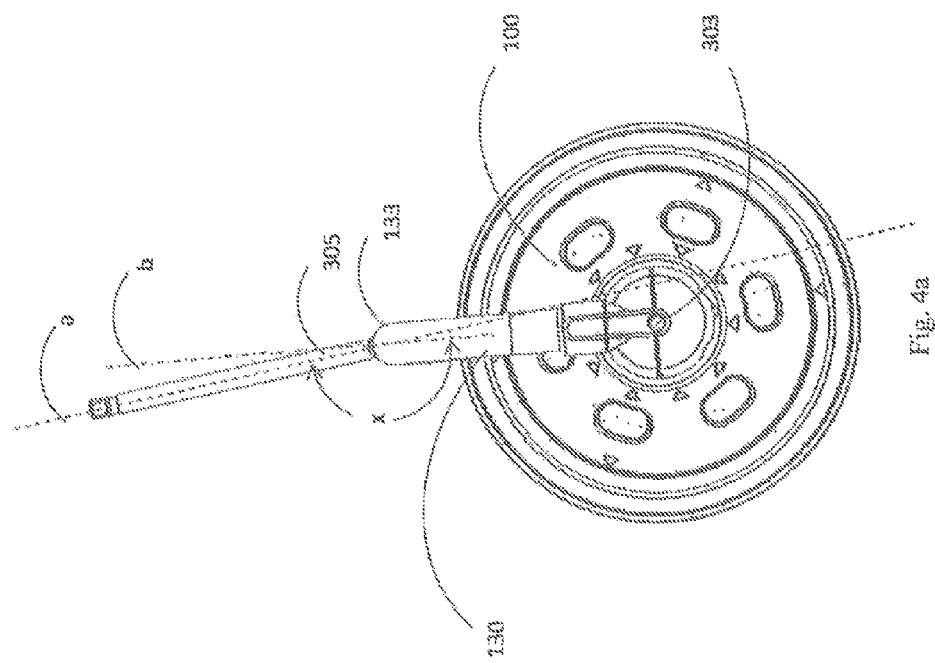

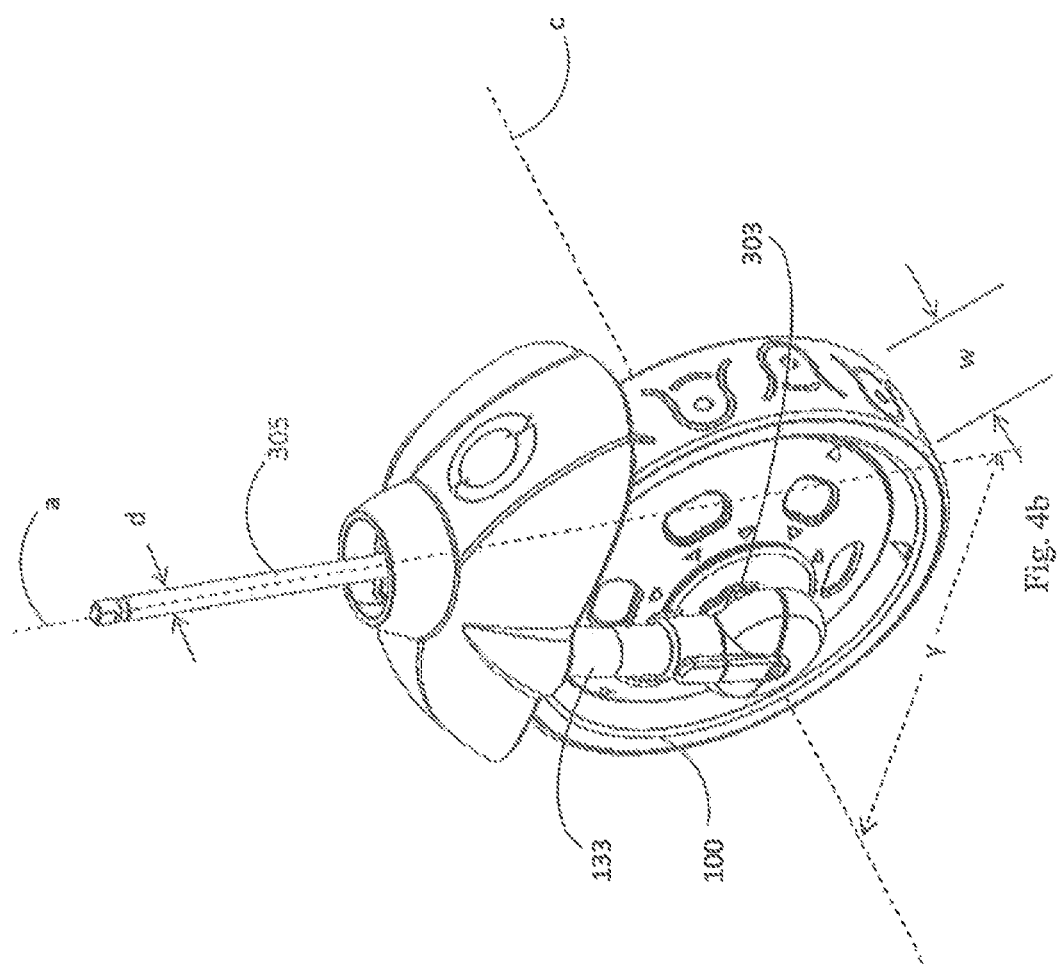

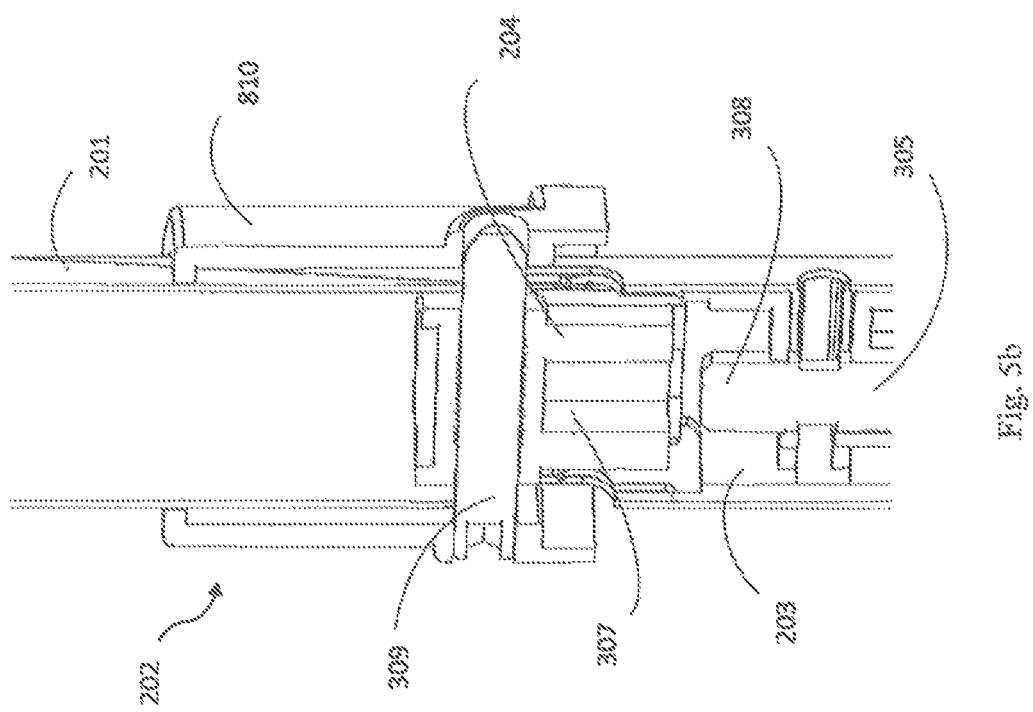

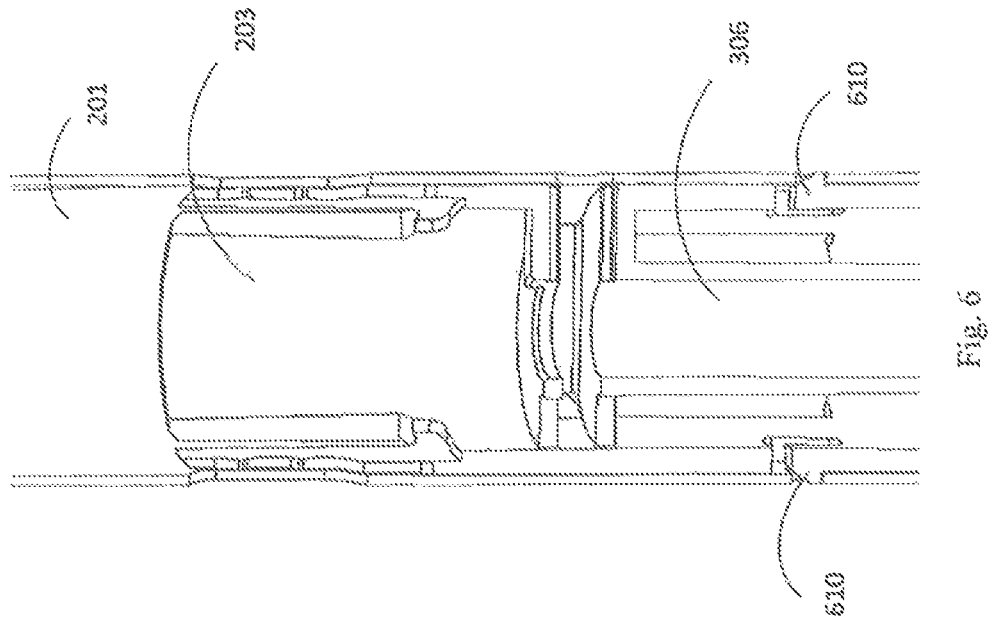

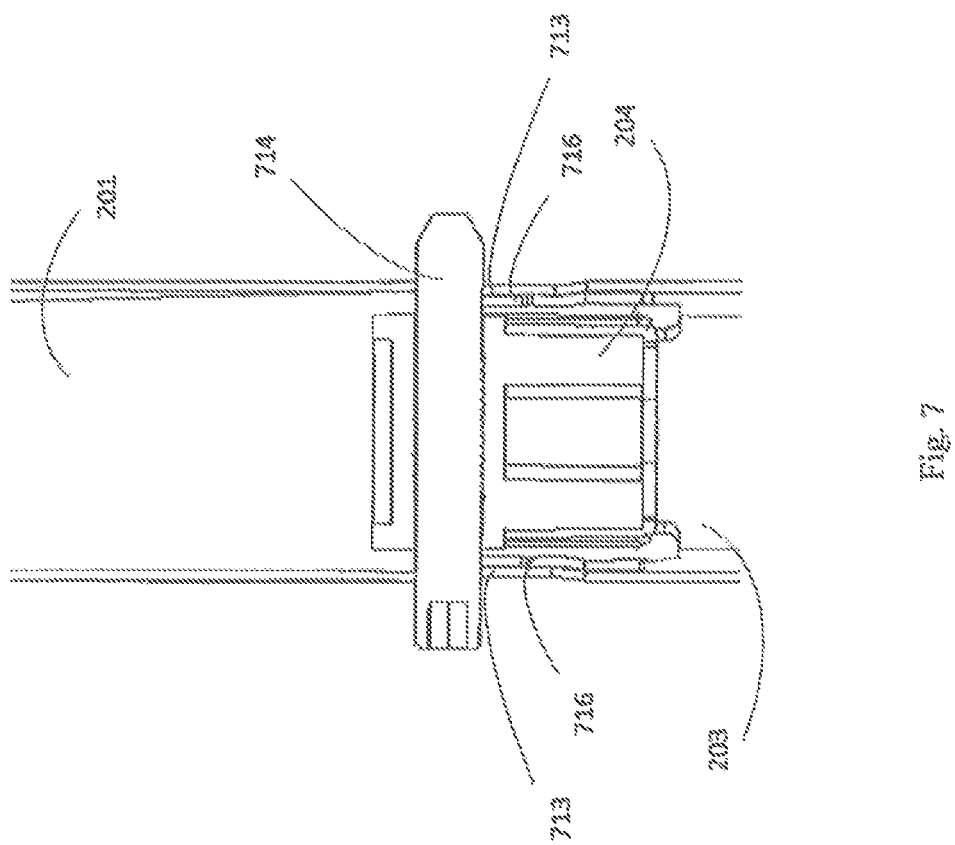

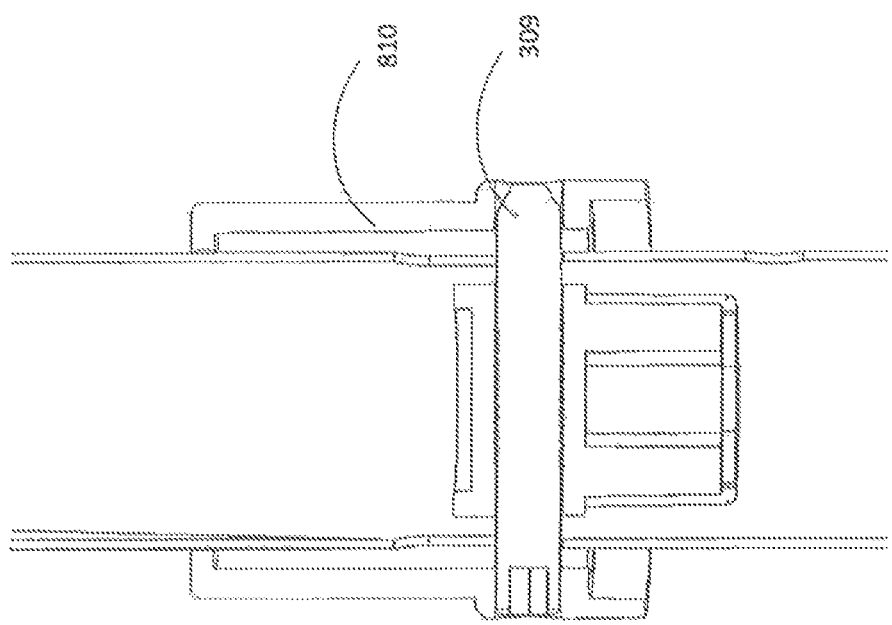

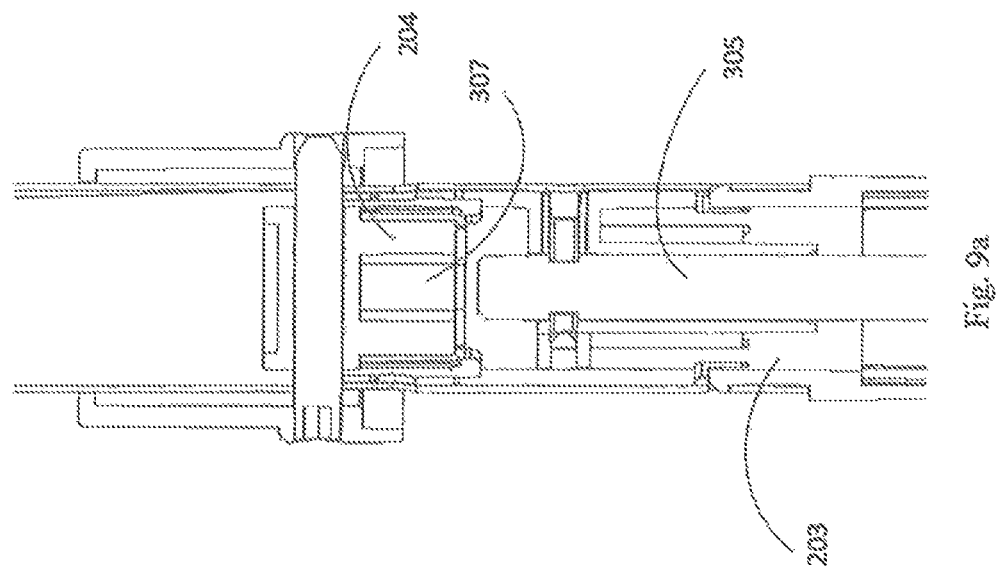

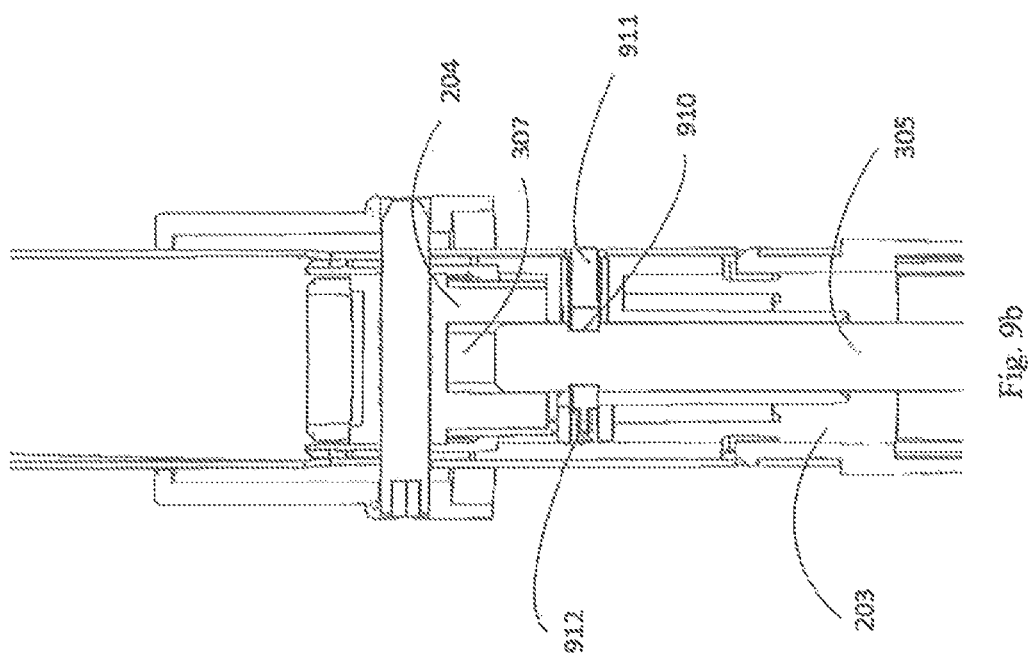

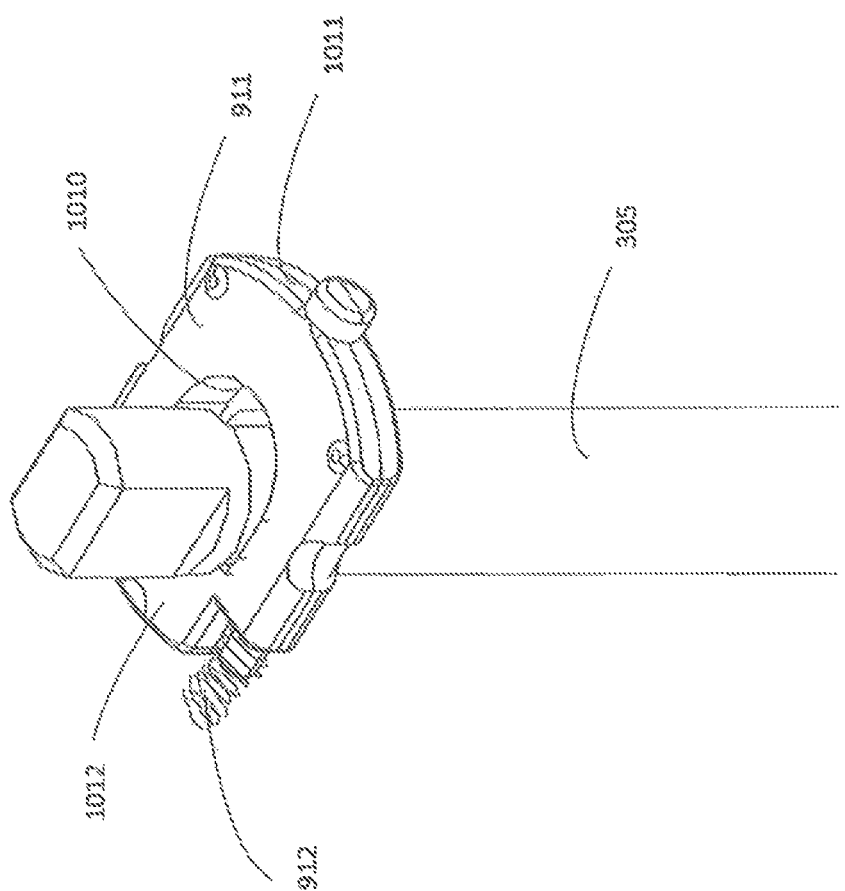

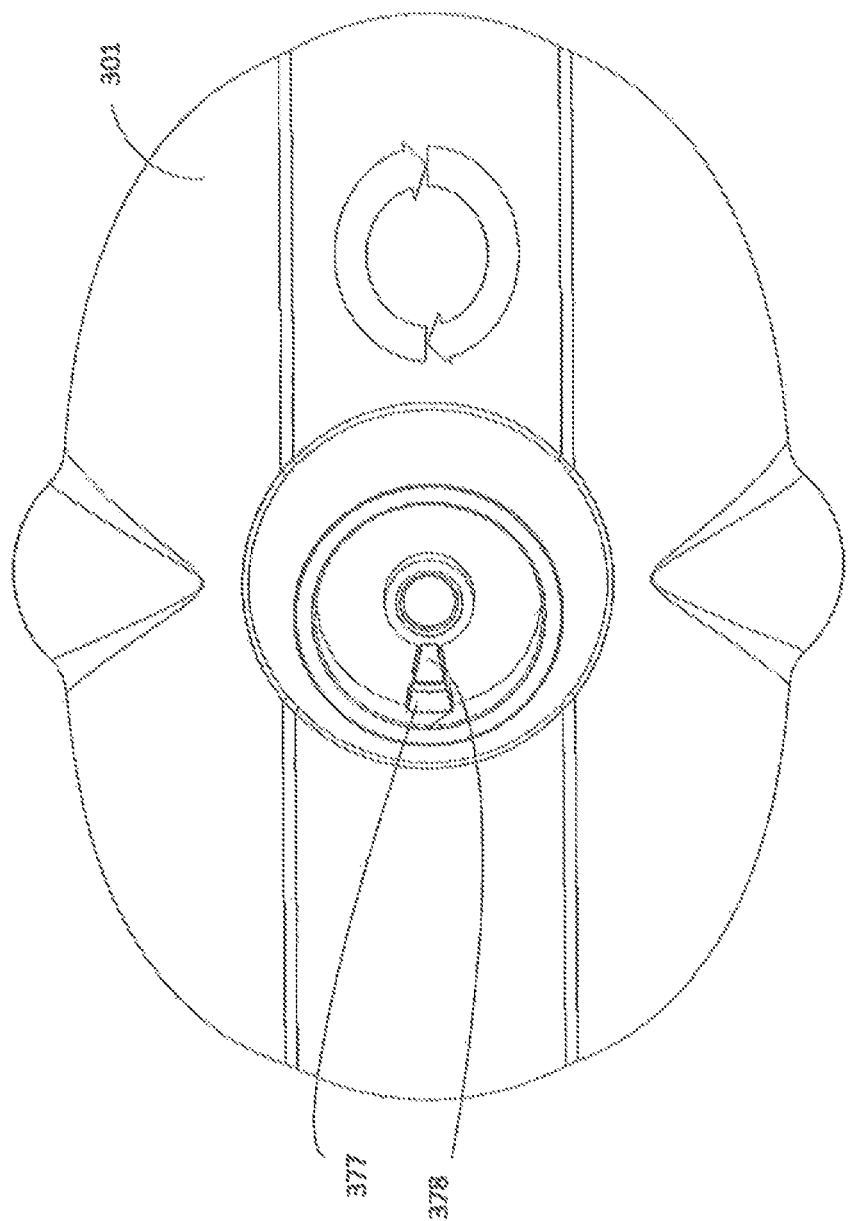

VEHICLE HAVING A SWIVEL WHEEL

This is a continuation of U.S. application Ser. No. 14/156,666, filed Jan. 16, 2014, now pending, which is a continuation of U.S. application Ser. No. 13/888,603, filed May 7, 2013, now abandoned, which is a continuation of U.S. application Ser. No. 13/493,407, filed on Jun. 11, 2012, now U.S. Pat. No. 8,439,385, issued May 14, 2013, which claims priority to U.S. Provisional Application 61/523,215, filed Aug. 12, 2011.

TECHNICAL FIELD

The invention generally relates to the field of riding vehicles.

BACKGROUND

Whether used for transportation or recreation, tricycles may be used for riders of different sizes and capabilities. Some tricycles are configured to be propelled and steered by the rider. In some instances, tricycles are configured to be pushed from behind, by an individual, such as an adult pushing a child. Typically, when the tricycle is propelled by the rider, the rider uses the pedals attached to the front wheel and steers the tricycle using a handle which is typically connected to the front wheel. Tricycles configured to be pushed from behind sometimes include a mechanical steering mechanism to permit an adult walking behind the tricycle to mechanically turn the front wheel.

SUMMARY

An exemplary embodiment of the invention may include a tricycle operable between a first mode of operation steerable by a tricycle rider, and a second mode of operation steerable by an individual pushing the tricycle. In both such first and second modes, an orientation of the front wheel may remain unchanged regardless of mode of operation. That is, the wheel axis need not necessarily be locked in a position leading the fork axis when the tricycle is in the first mode.

More specifically, a tricycle may include a fork having at least one blade configured to support a front wheel in a manner permitting the front wheel to rotate about a front wheel axis. A stem may extend from the fork, and a handle may be configured to turn the fork around a stem axis transverse to the front wheel axis. The handle, in the first mode, may be rotationally coupled with the stem in a manner permitting a tricycle rider to exert forces on the handle and thereby turn the fork. In a second mode, the handle may be rotationally uncoupled from the stem, preventing forces on the handle from turning the fork. A rotation restrictor may prevent the front wheel from turning to a position where the wheel axis leads the fork axis, and for maintaining the wheel axis in a position trailing the fork axis both when the handle is in the first mode and when the handle is in the second mode.

In one exemplary embodiment, the rotation restrictor is configured to permit the front wheel to turn less than 180 degrees (and is another exemplary embodiment less than 100 degrees), while maintaining the front wheel in a position such that the wheel axis trails the fork axis.

BRIEF DESCRIPTION OF THE DRAWINGS

In the drawings:

FIG. 4a is a side view of a front wheel fork and stem assembly consistent with an embodiment of the invention.

FIG. 4b is a perspective view of the front wheel assembly of FIG. 4a with mud guard added.

FIG. 5b is a cross-sectional front view of a coupling assembly consistent with an embodiment of the invention.

FIG. 6 is a cross sectional side view of a coupling member consistent with an embodiment of the invention.

FIG. 7 is a cross-sectional side view of a coupling assembly consistent with an embodiment of the invention.

FIG. 8 is a cross-sectional side view of another coupling assembly consistent with an embodiment of the invention.

FIG. 9a is a cross-sectional side view of yet another coupling assembly in an uncoupled position, consistent with an embodiment of the invention.

FIG. 9b is a cross-sectional side view of the coupling assembly of FIG. 9a in a coupled position;

FIG. 10 is a perspective view of a holding mechanism, according to one embodiment of the invention.

FIG. 12 is a top view of a mud guard, consistent with an embodiment of the invention.

DETAILED DESCRIPTION

The terms of "front", "rear", "down", "up", "bottom", "upper", "horizontal", "vertical", "right", "left" or any reference to sides or directions are used throughout the description for the sake of brevity alone are relative terms only and not intended to require a particular component orientation.

Figure 1:
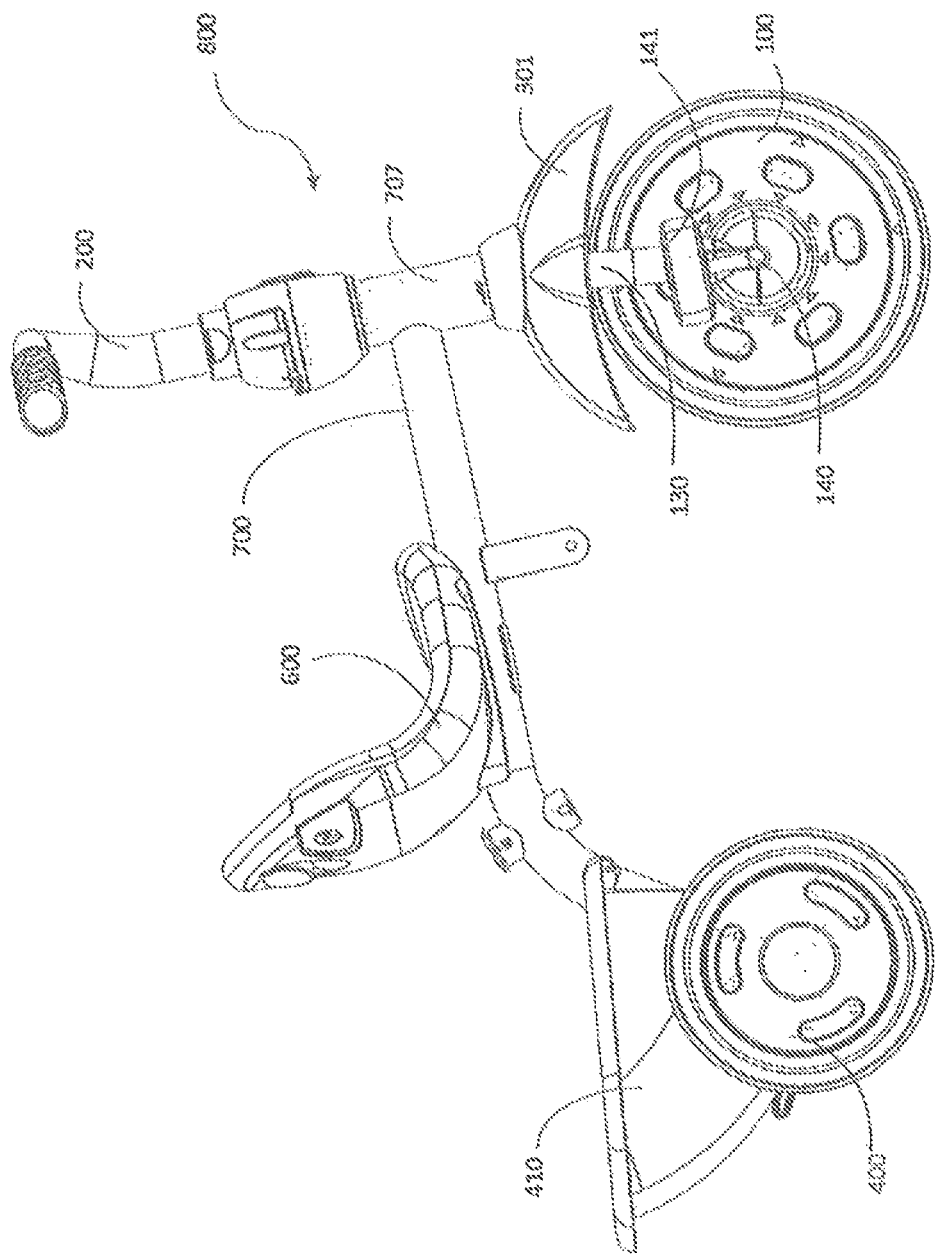
FIG. 1 is a side view of a tricycle, without parental handle, and which may be used in a first mode of operation, according to an embodiment of the invention.
Figure 2:
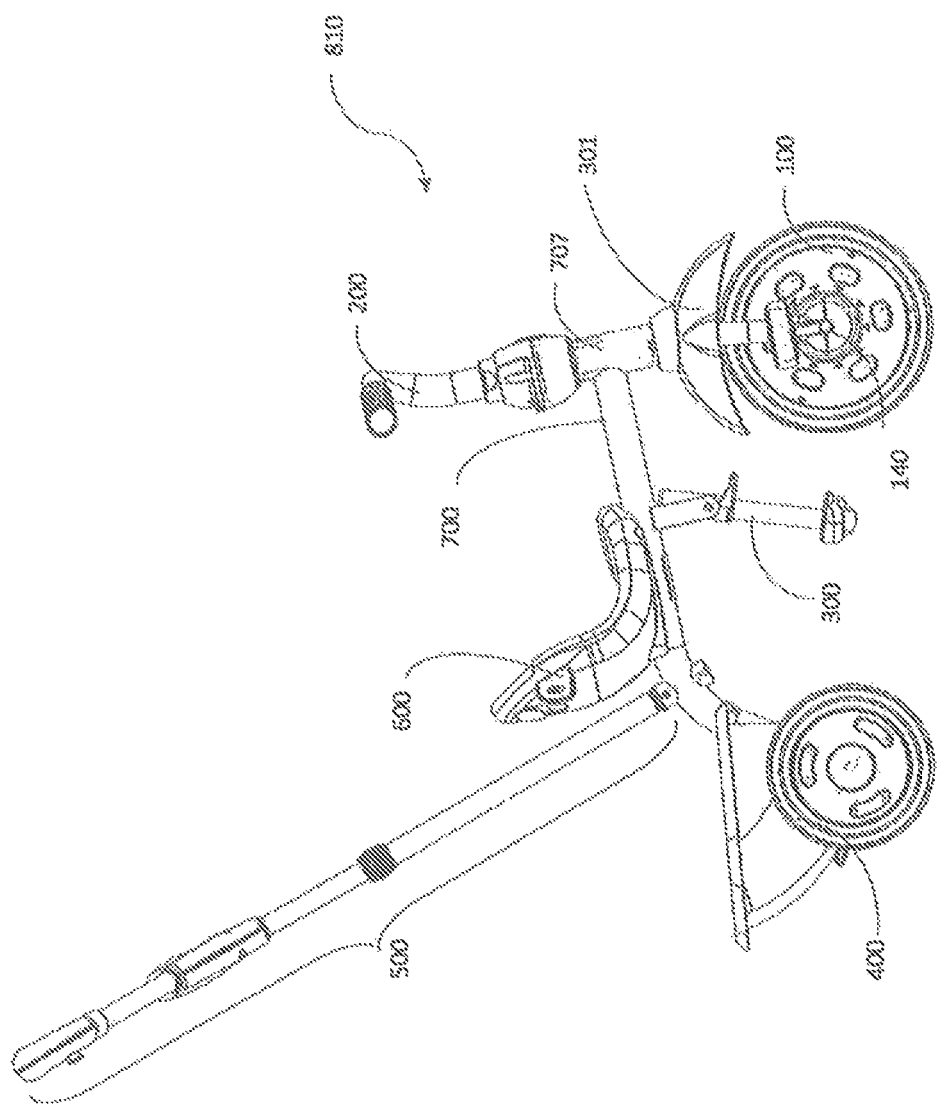
FIG. 2 is a side view of a tricycle, having a parental handle, which may be used in a second mode of operation, according to an embodiment of the invention.

Embodiments of the invention may include a tricycle operable between a first mode of operation steerable by a tricycle rider, and a second mode of operation steerable by an individual pushing the tricycle. A tricycle, as need herein, includes any vehicle with a wheel in the front and two wheels in the rear. FIG. 1, for example, illustrates is a side view of a tricycle, and winch can be used in a first mode of operation where a rider may propel the tricycle using pedals 141 and 142 (see FIG. 3). A second mode of operation may be accomplished when an individual behind the tricycle, pushes the tricycle using, for example, parental handle 500, as illustrated in FIG. 2.

Embodiments of the invention may include a tricycle having a frame and a pair of rear wheels for rotatable connection to the frame. As illustrated in FIG. 1, exemplary tricycle 800 may include a main frame 700 including head tube 707. Two rear wheels 400 (see FIG. 3) may be supported toward the rear of the main frame 700. The main frame 700 may be made of any material or have any structure, shape, or configuration capable of supporting a tricycle rider. For example, main frame 700 may include metal tubing or any other rigid material, and may be configured to support a seat 600.

Figure 3:
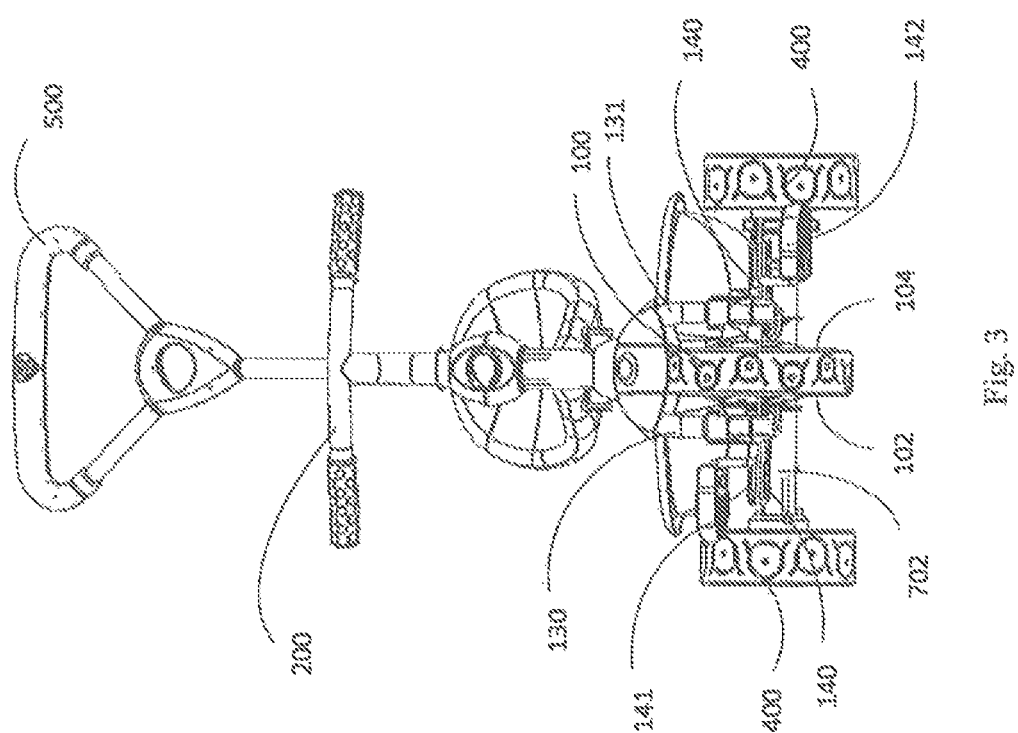
FIG. 3 is front view of the tricycle of FIG. 2.

In one embodiment, the rear wheels 400 may be rotatably supported on a central axle (the support shaft 702 of which is illustrated in FIG. 3) which may be inserted into the rear part of the main frame 700, effectively allowing the rear wheels 400 to rotate frontwards or backwards. A seat 600 may be connected, by any known method, to the main frame 700. The seat may have any configuration capable of supporting a rider. It may include or omit a back rest, may be integrally formed or formed of multiple materials, and/or may he uncovered, or covered in cloth, fabric, or other material.

The main frame 700 may also have a number of connection options for seat 600, effectively allowing the placing/adjustment of seat 600 at a number of locations along the main frame 700. In one embodiment, a basket 410 may be added and placed on the rear part of main frame 700 between the rear wheels 400.

FIG. 2 is similar to FIG. 1, adding a parental handle, which may be permanent, semi-permanent (e.g., removable with tools), or designed to be removable at will. The term "parental handle" as used herein, includes any structure, regardless of shape or material that may be grasped by an individual behind a tricycle and need to propel the tricycle from behind. By way of example, parental handle 500 illustrated in FIG. 2, may be made of one or more metal pipes or from any other rigid material. In one embodiment, the parental handle 500 may be telescopically adjustable to accommodate the height of the individual pushing the tricycle 810. The adjustable height mechanism of parental handle 500 may belong to any of the known adjusting techniques such as by a popup pin held within the inner pipe of the handle and which pops out of one of the holes of the outer pipe, where the pin may be pushed from one hole and pepped out of a different hole, for adjusting the height of the handle.

Embodiments of the invention may also include a front wheel having opposing sides and a front wheel axis. For example, and as illustrated in FIG. 3, front wheel 100 includes first side 102 and opposing second side 104. The wheel 100, as illustrated in FIG. 4b, includes a central axis c at its midpoint 303, about which the wheel 100 is rotatable.

Similarly, embodiments of the invention may include a pair of pedals, each pedal configured to rotate the front wheel. Numerous types of pedal may be employed constant with embodiments of the invention. Such pedals may include fixed pedals, removable pedals, foldable pedals, or pedals that flip up, retract, or have an otherwise alterable configuration. Thus, as used herein, the term pedal refers to any structure that permits a rider to propel a tricycle using foot power. An example of pedals, consistent with embodiments of the invention, include pedals 141 and 142 (see, e.g., FIG. 3). In addition, a pedal may be configured to rotate the front wheel a portion of the time (e.g., during the first mode when the rider propels the tricycle, and may be removable from, disengagable from, folded onto, or otherwise deactivatable during a second portion of the time (e.g., during the second mode when a parent pushes the tricycle from behind).

Each of pedals 141 and 142 may be connected to the center of the front wheel 100, via pedal rod 140. The pedal rod may be continuous and connected to both pedals, or the pedal rod 140 may be configured of two independent sections, each connected to a separate one of the pedals 141 and 142. In a first mode of operation, the propelling factor of pedal rod 140 may be connected, by any mechanical interconnection means, to a rotating factor of the frost wheel 100, thereby allowing rotation of the front wheel 100 using pedal rod 140. By rotating the pedal rod 140, the front wheel 100 may be rotated about its center axis, i.e. about the middle part of pedal rod 140 which may act as the front wheel 100 axle. Alternatively, the wheel may have a separate axle to which one or a pair of pedal rods connect.

Pedal rod 140 may include three parts; a middle part located at a center of the wheel 100 and used, among others, as an axle of wheel 100, a left side for connection to a left pedal, and a right side for connection to a right pedal 141.

Embodiments of the invention may include at least one blade configured to support the front wheel in a manner permitting the front wheel to rotate about the front wheel axis. As used herein, the term "blade" includes any structure capable of supporting the front wheel in a rotatable manner. A wheel may be supported, for example, on a single blade or on a pair of blades. FIG. 1 illustrates an example of a blade 130 used to rotatably support wheel 100. FIG. 3 illustrates wheel 100 supported by a pair of blades 130 and 131. When a pair of blades are employed, they are typically interconnected at upper ends opposite points at which they interconnect to the wheel axis and are collectively referred to as a fork (although, as used herein, the terra fork may also include structures that have just one blade.) Thus, in various figures, a fork is generally designated with the reference numeral 130. The fork may be formed of individual blades that curve toward each other, or, interconnecting structure may join two individual fork blades.

The middle part of pedal rod 140 may be pivotally held by the opposing distal ends of fork blades 130 and 131 in a manner such that the front wheel is capable of rotating about its center axis. A mud guard 301 may be disposed near a top of the fork 133, opposite distal ends supporting the wheel.

Embodiments of the invention may also include a stem extending from the fork and being rotatably connectable to the frame. A stem may be any structure connected to the fork and that is capable of conveying a turning force to the fork and/or that supports the fork in a rotatable manner. For example, FIG. 4a illustrates stem 305 that extends from fork 183. Thus, when either the fork 133 or the stem 305 rotates, the other may rotate with it. The stem may be rotatably connected to the frame 700 via the frame's head tube 707. The frame's head tube 707 may be a part of the frame 700, wielded to frame 700, or connected to frame 700 by any other means such as screws.

In some exemplary embodiments, it may be beneficial to employ a stem geometry that facilitates dual mode operation. For example, the width of the front wheel may be at least three times greater than the minimum diameter of the fork's stem. This configuration can lower turning friction, facilitating control from behind during the second mode of operation. In another embodiment, the stem may include a steel tube that has a minimum diameter that is at least four times smaller than, a width of the front wheel. The stem may be comprised of sections having varying diameters. In the above examples, a smallest or "minimum" diameter may be of particular interest, especially if that minimum diameter is at a rotational stem connection.

For example, when the front wheel is in a range of 25 to 51 mm, the stem may have a minimum diameter of 6 to 11 mm. For example, when the front wheel is in a range of 45 to 55 mm, the stem may have a minimum diameter of 9 to 11 mm. For example, when the front wheel is in a range of 20 to 60 mm, the stem may have a minimum diameter of 4 to 1.5 mm.

The stem's minimum diameter may be greater than one third the width of the front wheel, and the invention, in its broadest sense is not limited to any particular dimension.

Regardless of the dimensions of the stem, it may be held by a hoaxing which may reduce turning friction and facilitate the second mode operation and the first mode of operation as well.

As illustrated, for example in FIG. 4a, stem 305 may have a central axis a, and fork 133 may have a fork axis b and the stem 305 may be connected to the fork 133 in a manner such that the central axes a and b form an obtuse angle x therebetween. Angle x may be, for example, equal to or less than about 179° degrees. In some embodiments, angle x may be between about 170°-174°. In another embodiment the angle x may be between about 165°-179°. In a further embodiment the angle x may be between about 165°-173°. In yet another embodiment, the angle x may be between about 170°-175°. As the angle x approaches 180°, an ability to control steering from behind in the second mode of operation may be facilitated by a minimum stem diameter of three to four times smaller than the width of the front wheel. Thus, when the angle x is between 185°-179°, a stem with a minimum diameter of three to four times smaller than a width of the front wheel may be desirable. For example, as illustrated in FIG. 4b, width w of front wheel 100 may be at least three to four times greater than minimum diameter d of stem 305. For example, when the front wheel width w is in a range of 25 to 51 mm, the stem may have a minimum diameter d of 6 to 12 mm. For example, when the front wheel width w is in a range of 45 to 55 mm, the stem may have a minimum diameter d of 9 to 11 mm. For example, when the front wheel width w is in a range of 20 to 60 mm, the stem may have a minimum diameter d of 4 to 15 mm.

Also as illustrated in FIG. 4b, the central axis a of stem 305 extends transverse to and is offset from rotational axis c of front wheel 100 by a distance y. In one embodiment, the minimal distance y may be no more than about 50 mm. In another embodiment, the offset distance y is in the range of between about 18 mm and 25 mm. In yet another embodiment, offset distance y is in a range of about 15 mm and 40 mm. As the offset distance decreases with all else equal, so to decreases an ability to turn the tricycle from behind using parental handle 500. Thus, in one embodiment, when the offset distance is between 15 mm and 22 mm, the angle x between the stem and the fork is between about 7 and 10 degrees, and the minimum diameter d of the stem 305 is at least three times less than the width w of the front wheel. This combination of geometries is exemplary of a configuration that may permit the tricycle rider to steer in the first mode and a parent to steer in the second mode, even when, in both instances, the stem axis a leads the wheel axis c, as will be discussed later in greater detail.

In one embodiment the fork axis a is designed to lead the front wheel axis c regardless of whether the tricycle is in the first mode of rider steering control or the second mode of parental steering control. The leading stem axis in such instances positions the pedals farther rearward than they would ordinarily be if the stem axis a trailed the wheel axis c, potentially giving rise to a concern that the pedals may be too close to the rider for comfort. However, by employing a minimal angle x between the fork and the stem, peddles 141 and 142 may be maintained at a sufficient and comfortable distance from the rider without necessarily having to adjust the rider's position rearward, such as might occur with an adjustable frame (although adjustable frames may be used together with all embodiments of the invention). Thus, the frame 700 may be configured to maintain a fixed, non-adjustable distance between the fork stem and the rear wheels. This can occur, for example by constructing the frame 700 from a fixed length, non-adjustable piece of material.

In one embodiment, the shortest distance between the front wheel center and the imaginary line of the fork axis is between 10 mm-30 mm. In one embodiment, the shortest distance between the front wheel center and the imaginary line of the fork axis is between 15 mm-25 mm. In another embodiment the front wheel axis is designed to trail the stem axis in both mode of operations the first and the second. The figure though is non-limiting and alternatives may exist.

In one embodiment the width of the front wheel is at least three times greater than the minimum diameter of the fork's stem.

Embodiments of the invention may further include a rider handle, configured to turn the fork about a stem axis transverse to the front wheel axis. As used herein, the term "rider handle" is used broadly to refer to any structure, regardless of shape, material, or size, that can be grasped by a tricycle rider and used to turn the front wheel. For example the rider handle may be in the form of a handlebar, with a curved rod-like shape, or a straight rod-like shape. Alternatively, the rider handle may be in the form of a steering wheel or other closed or opened loop structure capable of manipulation by a rider. The rider handle may have a solid or open core. Like other parts of the tricycle, the rider handle may be made of any material or combination of materials.

The rider handle may be configured to turn the fork via a mechanical interconnection with, for example, either the fork or the stem. The mechanical interconnection may be direct or may include intermediate parts through which forces may be transferred via the rider handle to the front wheel.

Figure 5A:
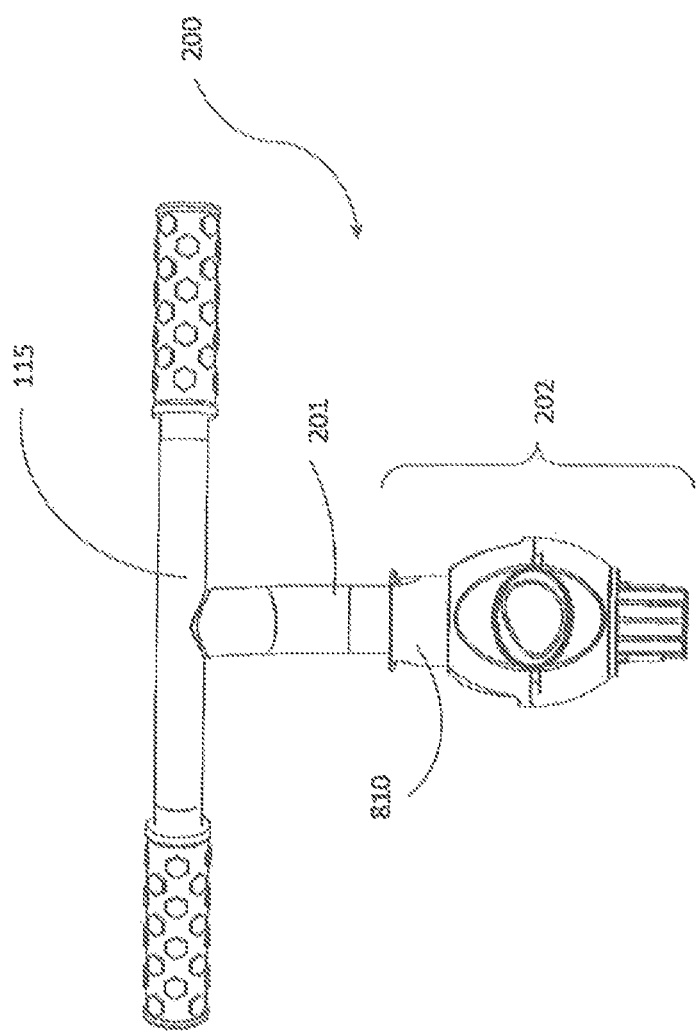
FIG. 5a is a front view of a handle assembly consistent with an embodiment of the invention.

By way of example only, a rider handle may include handlebar assembly 200 illustrated in FIGS. 1 and 2. As illustrated in greater detail in FIG. 5a, rider handle assembly 200 may include a handlebar 115, an arm 201, and a coupling mechanism 202.

The rider handle, in a first mode, may be configured to be rotationally coupled with the stem in a manner permitting a tricycle rider to exert forces on the rider handle and thereby turn the fork, and the rider handle in the second mode, may be configured to be rotationally uncoupled from the stem, preventing forces on the rider handle from turning the fork. Rotational coupling and decoupling of the rider handle from the fork may be accomplished in numerous mechanical ways, and the invention, in its broadest sense, is not limited to any particular mechanical interconnection. Rather, any manner in which the rider handle may be coupled and uncoupled to the fork is considered to fall within the scope and spirit of the invention. Moreover, the location of a coupling decoupling mechanism is not necessarily critical to embodiments of the invention. It may be located between a rider handle assembly and a stem, or it may be located between a stem and a fork.

Thus, by way of example only, the coupling mechanism 202 may, in a first mode, permit mechanical interconnection between the rider handle and the fork such that when a tricycle rider applies a turning force to the rider handle, the turning force is conveyed to the front wheel via the fork. In a second mode, the coupling mechanism 202 may decouple the rider handle from the fork in a manner permitting the rider handle to turn freely without conveying turning forces to the fork. This may be accomplished, for example, by permitting selective coupling and decoupling of the rider handle from the stem., (e.g., selective coupling and decoupling of rider handle assembly 200 and stem 305).

Thus, the term "couple", "coupling", "coupling mechanism" and "rotational engageable" are meant herein to include any mechanical engagement which transfers the rotation of one part to the other coupled part, by causing it to rotate similarly.

When, in a first exemplary mode of operation the steering of tricycle 800 is accomplished using rider handle assembly 200, i.e., the turning, e.g. left or right, of rider handle assembly 200 turns the fork 130 which turns the front wheel 100, the rider may assume control of steering while simultaneously propelling the tricycle 800 using the pedals 141 and 142. If when the rider is in control in the first mode, a person walking behind the tricycle tries to push the tricycle from behind using parental handle 500, the rider may prevent the person walking behind from assuming control. Thus the rider handle may be mechanically disconnected from the stem. When this occurs, the rider handle may cease to function as a steering mechanism and may simply function as support that the rider may grasp for balance or in order to permit a child to pretend to steer. In this circumstance, the rider handle may lock in a stationary position rotationally disconnected from the fork and front wheel, or may rotate freely within a range of motion independent of the fork and the front wheel.

Figure 5C:
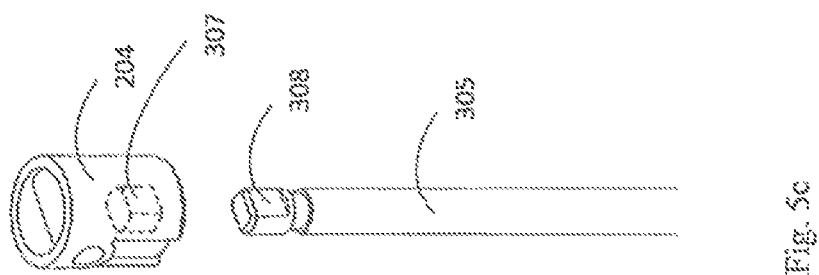
FIG. 5c is a perspective assembly view of a stem and coupling member consistent with an embodiment of the invention.

There are many differing ways in which a handle assembly may be rotatably coupled, and decoupled from a fork or fork stem. The examples provided in this specification are not intended to limit the invention to any particular example. Other coupling and decoupling mechanisms may be used such as a detent, a pin, a screw connector, or any other connectors. One example, illustrated in FIG. 5c involves an engageable and disengageable coupling. For example, a coupling member 204 associated with the rider handle assembly 200 may include a surface that selectively mates with an extension of the stem. As illustrated in FIG. 5c, for example, a shaped end 308 of stem 305 is selectively mateable with a corresponding shaped slot 307 of coupling member 204. When the shaped end 308 is seated in slot 307, force exerted on the rider handle assembly 200 is capable of turning the stem 305, and consequently fork 133 and wheel 100. When the shaped end 308 is decoupled from slot 807 of coupling member 204, the rider handle assembly 200 may be incapable of turning the wheel 100.

The stem's top end 308 in this example, has an almost rectangular shape, although for most of its length the fork stem 305 is round. The opening 307, depicted in silhouette since the opening 307 is hidden from this view point, has a corresponding shape thereto. Hence, while being inserted into the opening, the fork stem 305 is affixed, i.e. it cannot rotate, inside the second coupling member 204. Moreover, the almost rectangular shape is non-limiting and many other, non-round shapes can be used for the purpose of affixing the fork stem 305 inside the second coupling member's opening 307.

As illustrated in FIG. 5b, a knob 810, or any other manually activatable release mechanism, which may be a part of the coupling mechanism 202, may be used for coupling the handle arm 201 to the fork's stem 305. Specifically, and as described later in greater detail, when knob 810 is lifted, decoupling occurs, and when it is moved downward onto stem 305, coupling occurs. Thus, in a first mode, rider handle assembly 200 is rotation ally engageable with the fork's stem 305 in a manner permitting a tricycle rider to exert forces on the rider handle 200 and thereby turn the fork. On the other hand, the rider handle 200 is the second mode, may be rotationally disengageable from the fork's stem 305 for preventing forces on the handle from turning the fork. Examples of other structures that may be used to selectively couple a handle to a stem include protruding spring-biased pins that can be depressed to decouple and which can snap back into place to couple; or using the pin 309 without part 810 for coupling and decoupling the ride handle 200 to the stem 305, as described in relations to FIG. 7, etc. . . .

FIG. 5b is a cross-sectional view of a part of the coupling mechanism 202, according to one embodiment of the invention. The mechanism 202 allows coupling of the handle arm 201 and the fork stem 305. Three main members are depicted in the diagram: a first coupling member 203, a second coupling member 204 and a grasping member 810 (or a knob). The first coupling member 203 is statically coupled to the handle arm 201, thereinside. In the middle of the first coupling member 203 there is a shaft through which the fork stem 305 can be inserted. The second coupling member 204 is positioned inside the top end of the first coupling member 203, being slideable up and down. In the bottom of the second coupling member 204 there is an opening 307 into which the top end 308 of the fork stem 305 may fit. When the second coupling member 204 is in its upper position, it is disengaged from the fork stem 305. When the second coupling member 204 slides down, the fork stem 305 is inserted into the opening 307, and a coupling is achieved between the second coupling member 204 and the fork stem 305, and hence also between the steering arm 201 and the fork stem 305. In order to affix the fork stem 805 inside the second coupling member's 204 opening, the fork stem 305 has a non-round shape in its top end and the opening has a corresponding shape thereto, as illustrated in a non-limiting way. The grasping member 810 is, on one hand, external to the handle arm's tube 201 and on the other hand internal and connected to the second coupling member 204, by a connecting element 309 such as a pin, a screw, or any other element. Thus by sliding the grasping member 810 up and down, the second coupling member 204 also slides up and down as well. Moreover, the grasping member 810 as depicted in the diagram provides the individual using it a better grip and easier control on the second coupling member's 204 position (whether up or down). However, in other embodiments the grasping member 810 is redundant or not required, and then, the connecting element 309 alone may be used as a third coupling member, as described in relations to FIG. 7. The connecting element 309 has been depicted as a single element, such as pin etc. connecting both sides of the third coupling grasping member 810 via the handle arm 201 and the second coupling member 204. This is not mandatory though and in other embodiments other solutions can be applied instead. For example, by having a third coupling member composed of two parts (e.g., a "right part" and a "left part"), a short pin can be coupled to each part, while the short pin can penetrate the steering arm and form the connection with the second coupling member, whereas, in another embodiment, the two parts may be connected by a spring. In one embodiment second coupling member 204 may be designed from two interconnecting parts each made from a different material.

In one embodiment, the coupling mechanism 202 may be in the front tube 707 of the frame 700. In other embodiments, the coupling mechanism may appear on top of the front tube 707.

FIG. 6 is a cross-sectional view of the handle arm 201 holding the first coupling member 203, according to one embodiment of the invention. As depicted in the diagram, the first coupling member 203 is held by grasping elements 610, such as snaps, in the handle arm's tube 201. In the presently illustrated example, there are two snaps holding the first coupling element, one of each side, yet this in non-limiting and any other number of snaps can be used, as long as the first coupling member is affixed within the steering arm's tube. The shaft 306 is the shaft in which the fork stem may slide in. These figures though are non-limiting, and other coupling mechanisms may be used and other alternatives may exist.

FIG. 7 is a cross-sectional side view of the second coupling member 204 inside the first coupling member 203, according to one embodiment of the invention. In the handle arm's tube 201 there are grooves 713. Through these grooves a guiding element 714, connected to the second coupling member 204, can slide up and down, thus lifting and lowering, respectively, the second coupling member 204. The second coupling member 204 should stay in a low, down position when coupled to the pivot, and in an upper, high position when disconnected therefrom, a locking mechanism is described. According to one embodiment, this locking mechanism comprises protrusions 716 in the groove 713. When the guiding element crosses a protrusion 716, it is locked therebehind. In order to allow crossing of the guiding element, the protrusion should be made of a flexible or resilient material. In addition, if the steering arm is made of a non-flexible material, it is possible to attach thereto another layer of a flexible material, either from the inside or from the outside, forming the protrusion in this flexible layer. In the present embodiment, the first coupling member 203, which is attached to the handle tube 201 from the inside, can form this layer. Hence, as illustrated in the diagram, grooves are seen also in the first coupling member 203, wherein the protrusions 716 are implemented therein. This is non-limiting though and instead of using the first coupling member as the flexible layer, other solutions may be provided as a dedicated piece of flexible material which is attached to the handle arm's tube instead. Yet other embodiments may use other solutions, alternative to the protrusions, such as using a screw as the guiding element, screwing it in the position where it needs to be locked.

In those cases when the coupling mechanism includes a knob, such as element 810, as described with reference to FIG. 5b, the guiding element may form also the connecting element 309. Alternatively, there may exist a connecting element 309, which is additional to the guiding element. In one embodiment the guiding member alone may be the knob used for coupling and/or decoupling.

FIG. 8 illustrates the knob 810, according to one embodiment of the invention. As was noted above, in one embodiment, the connecting element 309 is able to slide up and down in the groove.

FIG. 9a is a cross-sectional side view of the coupling mechanism in the uncoupled position. It can be seen, from looking at FIG. 9a that the top end of the fork stem 305 is free, that is, it is not inserted into the opening 307 of the second coupling member 204. FIG. 9b is a cross-sectional side view of the coupling mechanism in the coupled position. In FIG. 9b, illustrating the coupled position, the top end of the pivot is inserted into the opening 307. In each one of the positions described with reference to FIGS. 9a and 9b, the fork stem 305 is rotatably held in the first coupling member 203. In order to keep the fork stem 305 held in the first coupling member 203, the fork stem 305 has an indentation 910. The indentation may include, for example, a groove that fully or partially circumscribes the stem 305, or it may include a confined recess in the stem 305. A locking member 911 having a spring 912, clenching the pivot's indentation, may prevent it from sliding out and releasing therefrom. Therefore, the locking member 911 may prevent the fork stem 305 from releasing from the coupling mechanism.

FIG. 10 is a perspective view of the holding mechanism for engaging the fork stem 305, according to one embodiment of the invention. The locking member 911, in this case, has an oval opening 1010 through which the head of fork stem 305 can pass, and one or more springs 912. The locking member 911 has a first side 1011 and a second side 1012. It is noted though that the locking member is not necessarily rectangular and it may not have definable sides. However, in order to explain the affixing mechanism, the embodiment illustrated is nearly rectangular in shape. When inserted into the handle tube, or into the first coupling member, the spring/springs 912 push the locking member 911 towards its 1011 side, against the tube's wall. Upon inserting the pivot into the shaft of the first coupling member, the fork stem 305 reaches the locking member 911. Then, the top of the pivots end pushes the locking mechanism 911 towards its 1012 side. When the pivot's indentation reaches the locking mechanism 911, the spring/springs 912 are slightly released and push the mechanism into the indentation, thus affixing the fork stem 305 in correspondence to the locking mechanism 911 and hence also in correspondence with the first coupling member. The mechanism illustrated in FIG. 10 is non-limiting and many other one-time locking mechanisms known per se may be used alternatively, as applicable.

Embodiments of the invention may also include at least rotation restrictor, for preventing the front wheel from turning to a position where the front wheel axis leads the fork axis, and for maintaining the front wheel axis in a position trailing the fork axis both when the tricycle is propelled by a tricycle rider in the first mode and when the tricycle is pushed from behind in the second mode. As used herein, "a rotation restrictor for preventing" includes any structure capable of restricting the rotational movement of the front wheel, regardless of whether the restrictor completely prevents rotation past a certain point, or whether the restrictor only prevents rotation past a certain point when forces exerted are below a threshold (e.g., the restrictor may exert a bias force that may be overcome by an opposing force greater than the bias force.) In either instance, a rotation restrictor consistent with embodiments of the invention may be used to maintain the front wheel in an orientation where the front wheel axis trails the fork axis in both a first rider steering mode and a second parental control mode.

Figure 11:
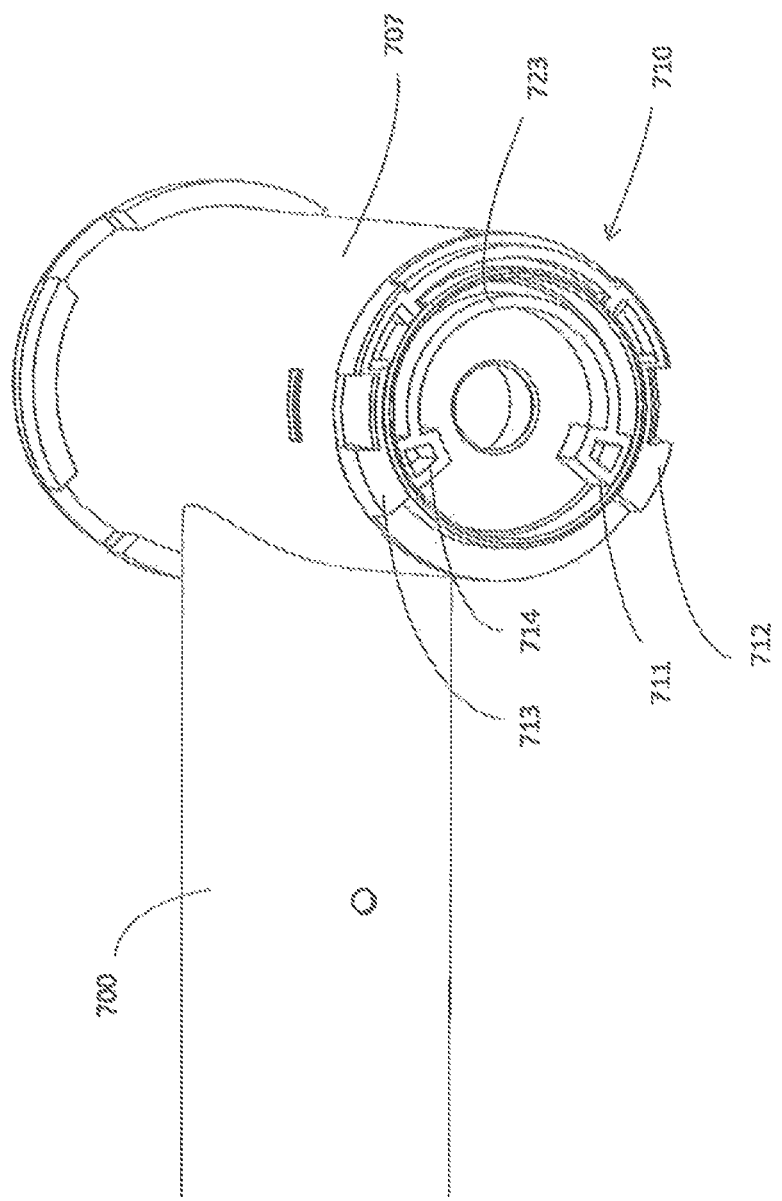
FIG. 11 is a perspective bottom view of the frame head tube consistent with an embodiment of the invention.

There are a myriad of ways in which rotation between two parts may be restricted. The invention, in its broadest sense, is not limited to any particular restriction mechanism. Thus, by way of example only, FIG. 11 is a diagram of the frontal part of the main frame 700 and the head tube 707, from a bottom view, without the front wheel assembly and without the rider handle assembly 200, according to an embodiment of the invention. The head tube 707, described in relations to FIGS. 1 and 2, may include a rotation restrictor in the form of stop 710, for preventing the front wheel from turning to a position where the wheel axis leads the fork axis. Although, for the sake of brevity, an embodiment of the stop is brought forth, other embodiments of a stop are possible. The stop 710 may have a number of protrusions, such as the protrusion 711, protrusion 712, protrusion 718, and protrusion 714. In one embodiment only two protrusions are needed, such as protrusions 711 and 718. In another embodiment only one protrusion may be needed. These protrusions may be used for limiting the swivel angle of the front wheel.

FIG. 12 is a schematic diagram of the mud guard 301, according to an embodiment of the invention. The mud guard 301, as described in relations to FIG. 1, may have at least one protrusion, two protrusions such as protrusions 377 and 378, or any number of protrusion. In this example, as depicted in the diagrams, the protrusion 377 of mud guard 301 is meant to fit between the protrusions 712 and 713 of stop 710, whereas protrusion 378 of mud guard 301 is meant to fit between the protrusions 711 and 714. The limit of the protrusions of the mud guard 301 between the protrusions of the stop 710 allows on one hand the turning of the mud guard in a preset angle, hence the turning of the front wheel in a preset angel, and on the other hand prevents the mud guard from turning in a wider angle thus maintaining the wheel axis in a position trailing the fork axis both when the handle is in the first mode and when the handle is in the second mode. In one embodiment the turning angle between the protrusions of the stop 710 may be between 80° and 100°. In another embodiment, the turning angle between the protrusions of the stop 710 may be around 90°. In one embodiment the turning angle between the protrusions of the stop 710 may be less than 180°. In one embodiment a protrusion 723 may be added in order to prevent the assembling of the mud guard incorrectly. In some embodiments the stop may be designed differently and located in other parts of the tricycle as long as it prevents the front wheel from turning to a position where the wheel axis leads the fork axis. For example the stop may be located in the stem of the fork, in the mud guard, in the handle arm, or in any place externally or internally to the tricycle. By way of further example, one or more stops may be located on the fork and/or the stem, to restrict relative motion therebetween. Alternatively, one or more stops could be located on the stem and/or the handle to restrict relative motion therebetween. Moreover, one or more stops might be located en a fixed portion of the tricycle, such as the frame or a fixed component connected to the frame, to restrict motion of any one of the fork, the stem, the handle, or a component connected, to any one of the foregoing. Thus, the exemplary illustrations in the figures are conceptual only and are not intended to limit the invention to a particular configuration of rotation restriction.

In one embodiment the rider handle angle is restricted as well due to safety considerations, protecting the body of the rider from being hit by the rider handle. In one embodiment the turning angle of the rider handle may be between 80° and 100°. In one embodiment the turning angle of the rider handle may be around 90°. In one embodiment the turning angle of the rider handle may be between 20° and 170°.

With such configurations, the front wheel of a tricycle may always be maintained in a position, with the stem axis leading the wheel axis, regardless of whether the tricycle is propelled by a rider or pushed from behind. Thus, in some embodiments, all a parent need do to take over steering control is to disengage the rider handle from the front wheel. The front wheel, in this example, need not be rotated to a new position, since the wheel position may remain the same regardless of the mode of operation. Similarly, if a parent is pushing the tricycle, and desires to turn steering control over to the rider, all the parent need do, in this embodiment, is to couple the rider handle to the front wheel. Since rider steering control may be achieved with the stem axis leading the wheel axis, the parent need not re-orient the front wheel.

Depending on the embodiment, the tricycle may provide an option of changing pedal position between modes of operation. In one embodiment a footrest 300 (see FIG. 2) may be connected to the main frame 700 for allowing the rider to rest his feet on the footrest 300 while the tricycle 810 is being pushed from behind. In one embodiment the footrest 300 is foldable, and it may be folded backwards under the chair 600 or it may be folded in any other way. In one embodiment the pedal rod 140 propelling factor may be disengaged from the rotating factor of the wheel 102, effectively allowing the pedals to stay static while the tricycle 810 is being pushed. The method for engaging and disengaging the pedal rod propelling factor and the rotating factor of the wheel is known in the art. In the second mode of operation the rider handle 200 may be uncoupled from the fork 130, effectively allowing an individual to push the tricycle 810 from behind and steer it using the parental handle 500 while the rider sits on the chair 600, rests his feet on the foot rest 300 and rests his hands on the rider handle 200. Meaning that in this second mode of operation, the steering of the tricycle 810 does not have to interfere with the rider's hands holding the rider handle 200. Nevertheless, the tricycle 810 may be changed to the first mode of operation by coupling the fork 130 with the rider handle 200, optionally detaching the parental handle 500, optionally folding the footrest 300, and optionally reengaging the pedal rod 140 to the front wheel 102. Thus in the first mode of operation the rider can propel the tricycle 810 by himself using the pedal rod 140 and steer the tricycle 810 by himself using rider handle 200.

While some embodiments of the invention have been described by way of illustration, it will be apparent that the invention can be carried into practice with many modifications, variations and adaptations, and with the use of numerous equivalents or alternative solutions that are within the scope of persons skilled, in the art, without departing from the invention or exceeding the scope of claims.

What is claimed is:

1. A tricycle operable between a first mode of operation steerable by a tricycle rider, and a second mode of operation steerable by an individual pushing the tricycle, the tricycle comprising:
   a frame;
   a pair of rear wheels for rotatable connection to the frame;
   a front wheel having opposing sides and a front wheel axis;
   a pair of pedals, each pedal configured to rotate the front wheel;
   a fork having at least one blade configured to support the front wheel in a manner permitting the front wheel to rotate about the front wheel axis;
   a stem configured to be rotatably moveable with the fork and rotatably connectable to the frame;
   a rider handle, configured to turn the fork about a stem axis transverse to the front wheel axis, the rider handle, in the first mode, being configured to be rotationally coupled with the stem in a manner permitting a tricycle rider to exert forces on the rider handle and thereby turn the fork, and the rider handle in the second mode, being configured to be rotationally uncoupled from the stem, preventing forces on the rider handle from turning the fork; and
   at least one rotation restrictor, for preventing the front wheel from turning to a position where the front wheel axis leads the stem axis, and for maintaining the front wheel axis in a position trailing the stem axis both when the tricycle is propelled by a tricycle rider in the first mode and when the tricycle is pushed from behind in the second mode.

2. The tricycle of claim 1, wherein the fork includes two blades configured to rotatably support the front wheel therebetween.

3. The tricycle of claim 1, wherein the handle is configured to be uncoupled from the stem via a manually activatable release mechanism.

4. The tricycle of claim 3, wherein the handle is configured to be coupled to the stem via a snap-in-place mechanism.

5. The tricycle of claim 1, wherein the rotation restrictor is configured to permit the front wheel to turn less than 180 degrees, while maintaining the front wheel in a position such that the wheel axis trails the stem axis.

6. The tricycle of claim 1, wherein the rotation restrictor is configured to permit the front wheel to turn less than 100 degrees, while maintaining the front wheel in a position such that the wheel axis trails the stem axis.

7. The tricycle of claim 1, further comprising a coupling mechanism associated with the stem, for permitting an operator to selectively couple and uncouple a rotational connection between the handle and the stem.

8. The tricycle of claim 7, wherein the coupling mechanism is configured such that in the second mode, the rider handle is freely rotatable independent of the stem, and in the first mode the rider handle is locked to the stem for rotation with the stem.

9. The tricycle of claim 1, wherein the front wheel has a diameter and a width, wherein the stem has a minimum diameter, and wherein the width of the front wheel is at least three times greater than the minimum diameter of the stem.

10. The tricycle of claim 1, wherein the stem includes a steel tube that has a minimum diameter that is at least four times smaller than a width of the front wheel.

11. The tricycle of claim 1, wherein the frame is configured to maintain a fixed, non-adjustable distance between the fork stem and the rear wheels.

12. The tricycle of claim 5, wherein the frame is configured to maintain a fixed, non-adjustable distance between the fork stem and the rear wheels.

13. The tricycle of claim 1, further including a parental handle extending from a rear portion of the tricycle and permitting the tricycle to be pushed and steered from behind.

14. A tricycle operable between a first mode of operation steerable by a tricycle rider, and a second mode of operation steerable by an individual pushing the tricycle, the tricycle comprising:
a frame;
a pair of rear wheels for rotatable connection to the frame;
a front wheel having opposing sides and a front wheel axis;
a pair of pedals, each pedal configured to rotate the front wheel;
a fork having at least one blade configured to support the front wheel in a manner permitting the front wheel to rotate about the front wheel axis;
a stem configured to be rotatably moveable with the fork and rotatably connectable to the frame;
a rider handle, configured to turn the fork about a stem axis transverse to the front wheel axis, the rider handle, in the first mode, being configured to be rotationally coupled with the stem in a manner permitting a tricycle rider to exert forces on the rider handle and thereby turn the fork, and the rider handle in the second mode, being configured to be rotationally uncoupled from the stem, preventing forces on the rider handle from turning the fork; and
wherein the front wheel, the pair of pedals, the fork, and the stem are configured to cooperate with each other in a manner such the front wheel axis trails the stem axis both when the tricycle is propelled by a tricycle rider in the first mode and when the tricycle is pushed from behind in the second mode.

15. The tricycle of claim 14, wherein the fork includes two blades configured to rotatably support the front wheel therebetween.

16. The tricycle of claim 14, wherein the handle is configured to be uncoupled from the stem via a manually activatable release mechanism.

17. The tricycle of claim 16, wherein the handle is configured to be coupled to the stem via a snap-in-place mechanism.

18. The tricycle of claim 14, further comprising a coupling mechanism associated with the stem, for permitting an operator to selectively couple and uncouple a rotational connection between the handle and the stem.

19. The tricycle of claim 18, wherein the coupling mechanism is configured such that in the second mode, the rider handle is freely rotatable independent of the stem, and in the first mode the rider handle is locked to the stem for rotation with the stem.

20. The tricycle of claim 14, wherein the front wheel has a diameter and a width, wherein the stem has a minimum diameter, and wherein the width of the front wheel is at least three times greater than the minimum diameter of the stem.

21. The tricycle of claim 14, wherein the frame is configured to maintain a fixed, non-adjustable distance between the fork stem and the rear wheels.

22. The tricycle of claim 14, further including a parental handle extending from a rear portion of the tricycle and permitting the tricycle to be pushed and steered from behind.

* * * * *